United States Patent [19]

Blauhut

[11] Patent Number: 4,762,106

[45] Date of Patent: Aug. 9, 1988

[54] ARRANGEMENT FOR THE GENERATION OF A TRIGGER PULSE FOR THE IGNITION OF FUEL IN AN INTERNAL COMBUSTION ENGINE

[75] Inventor: Reinhold Blauhut, Werdohl, Fed. Rep. of Germany

[73] Assignee: Atlas Fahrzeugtechnik GmbH, Werdohl, Fed. Rep. of Germany

[21] Appl. No.: 747,263

[22] Filed: Jun. 21, 1985

[30] Foreign Application Priority Data

Jul. 2, 1984 [AT] Austria ................................ 2131/84

[51] Int. Cl.$^4$ .............................................. F02P 5/15
[52] U.S. Cl. ................................... 123/425; 123/416; 73/35; 73/115
[58] Field of Search ................ 123/425, 435, 416; 73/115, 35

[56] References Cited

U.S. PATENT DOCUMENTS

| | | | |
|---|---|---|---|
| 4,190,027 | 2/1980 | Inui et al. | 123/425 |
| 4,232,545 | 11/1980 | Dobler et al. | 123/425 |
| 4,233,943 | 11/1980 | Rogora et al. | 123/425 |
| 4,269,154 | 5/1981 | Iwata et al. | 123/425 |
| 4,377,999 | 3/1983 | Komurasaki et al. | 123/425 |
| 4,417,556 | 11/1983 | Latsch | 123/425 |
| 4,465,046 | 8/1984 | May | 123/435 |

FOREIGN PATENT DOCUMENTS

| | | |
|---|---|---|
| 2443413 | 3/1976 | Fed. Rep. of Germany . |
| 2939690 | 4/1981 | Fed. Rep. of Germany . |
| 2432097 | 2/1980 | France . |

*Primary Examiner*—Andrew M. Dolinar
*Attorney, Agent, or Firm*—Peter K. Kontler

[57] ABSTRACT

Arrangement for the generation of a trigger pulse for the ignition of fuel in an internal-combustion engine, the trigger pulse being generated with a present crankshaft angular position, related to a reference angle position. The technical problem is an optimizing of the time of the trigger pulse under all operating conditions and for all operating parameters of the internal-combustion engine. In at least one combustion chamber of the internal-combustion engine the peak value angle position of the ionic current peak value, related to the reference angle position, is determined. The peak value angle position is compared with a desired angle position and a difference value is desired. The trigger pulse is shifted in time in the sense of a reduction of the said difference value.

3 Claims, 2 Drawing Sheets

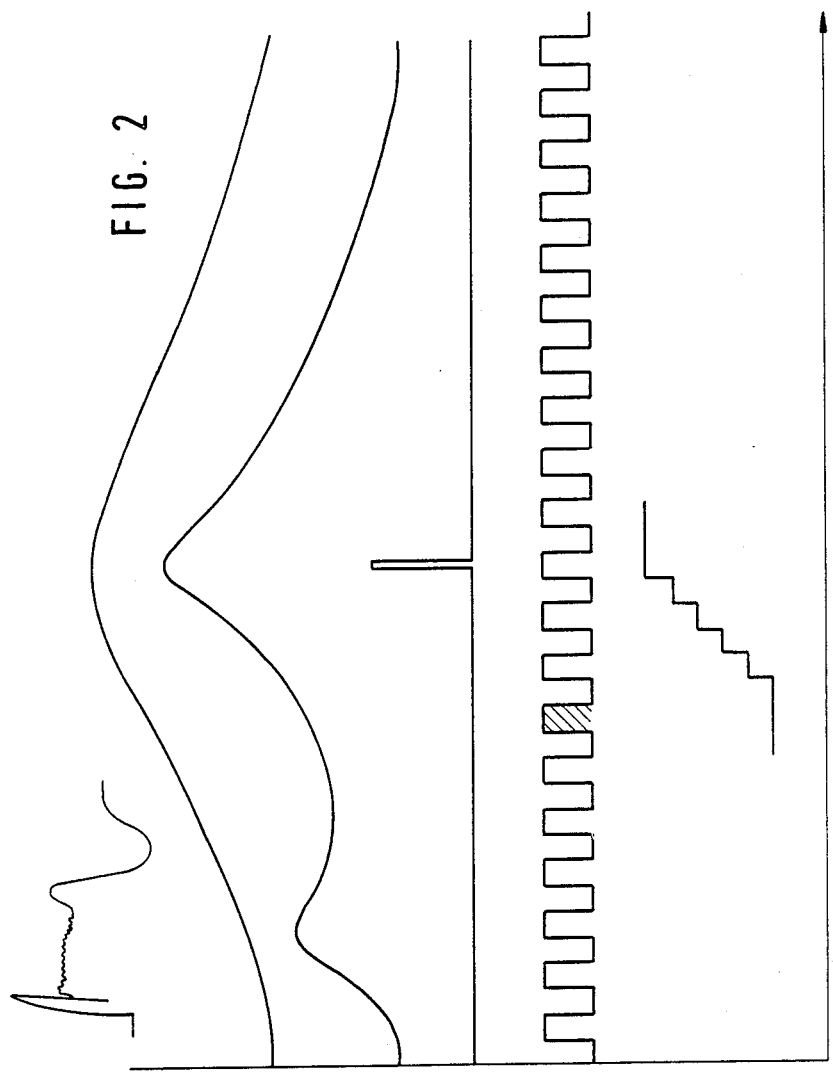

ARRANGEMENT FOR THE GENERATION OF A TRIGGER PULSE FOR THE IGNITION OF FUEL IN AN INTERNAL COMBUSTION ENGINE

BACKGROUND OF THE INVENTION

1. Field of the Invention

The invention relates to an arrangement for the generation of a trigger pulse for the ignition of fuel in an internal-combustion engine, the trigger pulse being generated with a preset crankshaft angular position, related to a reference angle position.

2. Description of the Prior Art

The peak pressure in the combustion chamber of an internal-combustion engine must be reached in a determined position of the piston or in a determined crankshaft angular position, respectively, related to a reference angle position, normally related to the upper dead center, so that the efficiency of the engine is optimal. Due to the finite velocity of combustion within the ignited air-fuel mixture it is necessary to advance the ignition pulse in regard to the upper dead center with increasing speed. For this a large number of mechanical, electronical-analog, and digital ignition systems are known.

The velocity of combustion of the air-fuel mixture inter alia depends also on the filling of the combustion chamber so that in the part-load range the velocity of combustion decreases due to the reduced filling. Consequently the trigger pulse is shifted to an advanced angle value by means of pressure sensors. By this technique a shifting of the ignititon pulse is possible only as a function of parameters, which are preprogrammed. Variations of further operational conditions, such as fuel quality, air temperature, engine temperature, practically cannot be detected due the fact that a sensory system necessary is too complicated and expensive in practice.

SUMMARY OF THE INVENTION

It is the object of the present invention to optimize the time of the trigger pulse under all operating conditions and for all operating parameters of the internal-combustion engine.

According to the present invention this object is achieved in that in at least one combustion chamber of the internal-combustion engine the peak value angle position of the ionic current peak value, related to the reference angle position, is determined, that the peak value angle position is compared with a desired angle position and a difference value is derived, and that the trigger pulse is displaced in time in the sense of a reduction of said difference value.

The invention utilizes the circumstance that the concentration of the charge carriers in a burning air-fuel mixture increases with the pressure and the temperature of the gas. Consequently, also the ionic current increases with increasing pressure and rising temperature. The peak value of the ionic current is detected. In this connection, an evaluation as peak value angle position related to a reference angle position of the crankshaft is provided. The absolute ionic current peak value is without any significance.

The present invention differs, in a non-obvious manner, from the prior art in that, by measurement of the ionic current, immediately the peak value angle position of the ionic current peak value and thus of the pressure peak value in the combustion chamber is determined. This peak value angle position is compared with a desired angle position. According to the difference value obtained the trigger pulse is shifted by a control circuit so that the difference value disappears. Consequently, the invention enables such an operation of the internal-combustion engine that the pressure peak value is always reached exactly in the preset angle position. As ionic current probe the spark plug itself is suitable, which is supplied with a positive measuring voltage.

The measurement of the ionic current may be carried out for one combustion chamber or one cylinder of the internal-combustion engine or even for all the cylinders. In case of measurement in all the cylinders filling differences may be compensated for. In case of an evaluation of the pressure curves of all cylinders the angle position of the pressure peak value may be averaged, in order to have at disposal an averaged trigger signal for the next working cycle which trigger signal ignites all the cylinders in the same angle position.

The process of the present invention may be applied in case of a generation of the trigger pulse by means of analog circuits as well as by means of digital circuits.

One arrangement according to the invention with digital generation of the trigger pulse is characterized by the following features:

(a) a tooth pulse sensor, directed to the teeth of a starter gear rim, generates a pulse sequence proportional to the crankshaft rotation;

(b) a reference pulse sensor, directed to a reference marking, generates one reference pulse per crankshaft revolution;

(c) a counter is connected to the reference pulse sensor with its reset input, to the tooth pulse sensor with its counting input, and to a peak value circuit with its inhibiting input;

(d) the peak value circuit evaluates the current flowing through a ionic current probe and delivers an inhibiting signal when the ionic current peak value is reached;

(e) a comparator circuit compares the count of the counter with a desired value on the input line group and supplies a signal which indicates whether the ionic current peak value occurs prematurely or too late;

(f) a trigger circuit counts the tooth pulses and supplies on the basis of a preset value a trigger signal, additional pulses being counted additively or subtractively into the trigger circuit according to the premature or too late occurrence of the ionic current peak value.

BRIEF DESCRIPTION OF THE DRAWING

The invention will be described in the following with reference to the accompanying drawing showing an arrangement for the digital generation of the trigger pulse and wherein FIG. 2 shows different waveforms which are of importance for the operation of the internal-combustion engine.

DESCRIPTION OF THE PREFERRED EMBODIMENT

Figure 1:
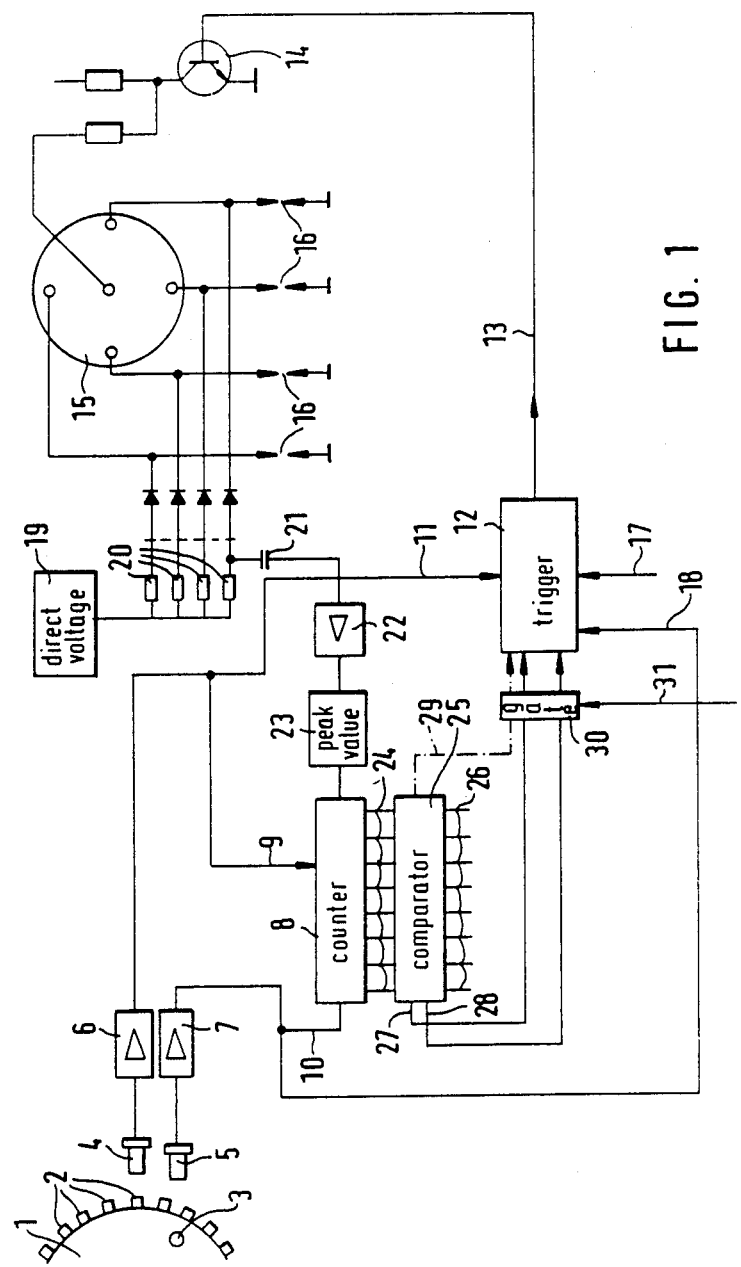
FIG. 1 is a block diagram of an arrangement according to the invention; whilst

FIG. 1 shows a peripheral range of the flywheel 1 coupled with the crankshaft of an internal-combustion engine, e.g. of an Otto engine. The flywheel 1 carries a starter gear rim with teeth 2 as well as an additional marking 3 which defines a reference angle position. The marking 3 may also be combined with one of the teeth 2. A tooth pulse sensor 4 as well as a reference pulse sensor 5 which detects the marking 3 is arranged opposite the periphery of the flywheel. The tooth pulse sensor 4 and the reference pulse sensor 5 may also be combined into a common sensor. An amplifier 6, 7 and a pulse shaper are arranged after each sensor. If necessary, the tooth pulses may also be doubled.

The invention provides a counter 8 for the counting of the tooth pulses arriving on the line 9. The reference pulses are fed via the line 10 into the reset input of the counter 8 and reset the counter 8 to the zero condition and initiate a new counting operation so that a counting cycle is effected during each revolution of the crankshaft.

The angle pulses are fed on the line 11 into a trigger circuit 12 for the generation of a trigger pulse on the line 13. The line 13 leads to a transistor ignition circuit 14 to which via an ignition distributor 15 the spark plugs 16 in the combustion chambers of a combustion engine are connected. Of course, the ignition distributor 15 may be of any design.

The trigger circuit 12 contains substantially a preset and reset counter. On a line 17 a preset value may be inserted. On a line 18 the reference pulses for the specific resetting of the trigger circuit 12 to the preset value and for the triggering of a new counting cycle are applied. A trigger pulse on the line 13 occurs when an overflow value of the trigger circuit 12 is reached.

A direct voltage source 19 applies via resistors 20 a direct current to each spark plug 16. The discharge gap of each spark plug 16 serves as ionic current measuring probe for the ionic current, generated by the direct current. The ionic current of each cylinder effects a voltage drop in the specific resistor 20. The voltage is decoupled via a capacitor 21 which is shown merely for one ionic current measuring probe. The voltage is amplified in an amplifier circuit 22 and is fed into a peak value circuit 23. This peak value circuit 23 determines the ionic current peak value. The ionic current peak value corresponds to the specific pressure peak value in the combustion chamber. The ionic current peak value is detected on regard to its time position. The absolute value of the ionic peak value is of slight significance. Consequently the peak value circuit 23 is built up as a self-adjusting circuit.

The output signal of the peak value circuit 23 is applied to the inhibiting input of the counter 8 and inhibits in each case the counting operation so that then on the output line group 24 of the counter 8 the specific peak value angle position for the ionic current peak value, or the peak value of the combustion pressure, respectively, is shown. The specific count is indicated in tooth pulses, or angle pulses, respectively, in regard to a reference angle position.

On the input line group 26 a desired angle position is fed into the comparator circuit 25. The value of the peak value angle position of the output line group 24 is also applied to the comparator circuit 25. In the comparator circuit 25 these two counts are compared with each other. According to the variation of the peak value angle position from the desired angle position a signal appears on the output line 27 or 28 which signal indicates a premature occurence of the ionic current peak value, or a delay thereof, respectively, in regard to the desired angle position. E.g. a signal appears on the output line 27, if the value of the peak value angle position is higher than the value of the desired angle position, i.e., if the ionic current peak value and, thus, the peak value of the cylinder pressure occurs too late. Accordingly, a signal appears on the output line 28, if the peak value of the cylinder pressure appears too premature. If necessary, a further output line 29 may be provided, on which the extent of the variation is indicated.

The output lines 27, 28 and 29 transmit signals via a gate circuit 30 to the input of the trigger circuit 12. The input line 31 for the gate circuit 30 receives an inhibiting signal, if the speed drops below a lower limit value. With low speeds, that means particularly during the starting operation and in the slow-running period consequently a displacement of the trigger pulse in regard to the desired value does not occur.

FIG. 2 shows differrent characteristic lines. In the upper row the voltage curve of an ignition spark is shown. The second row shows the curve of the cylinder pressure. In the following row the curve of the ionic current is illustrated. It is evident that the ionic current peak value corresponds to the peak value of the cylinder pressure. The following row shows the peak value pulse. In a further row the tooth pulses are indicated. One tooth pulse is marked. This tooth pulse corresponds to the reference position for the pressure peak value. Tooth pulses counted after this reference tooth pulse in the lowest characteristic line indicate the extent of the delay of the ionic current peak value in regard to the desired angle position. According to this delay additional substractive pulses are put into the trigger circuit 12 so that the trigger pulse on the line 13 occurs earlier during the next revolution of the crankshaft and the ignition pulse is displaced to an earlier time. According to that the ionic current peak value and, thus, the pressure peak value is shifted to the desired angle position.

The invention is described above for a control loop, which is associated with a cylinder of a combustion engine. It is also possible to provide a separate control loop for each cylinder. Accordingly one may deviate a separately controlled trigger pulse for each cylinder. One may also determine for all the cylinders a common averaged trigger pulse.

We claim the following:

1. An arrangement for controlling the time at which an ignition signal is applied to a sparkplug in an internal combustion engine based on a peak value of an ionic current in at least one combustion chamber for a reciprocable piston, comprising:

(a) a tooth pulse sensor responsive to the teeth of a starter gear rim operatively coupled to the engine crankshaft for generating tooth pulses proportional to the angular displacement of the crankshaft;

(b) a reference pulse sensor responsive to a reference marking on said starter gear rim for generating one reference pulse per crankshaft revolution at a predetermined position out of line with the top dead center position of the piston;

(c) a counter having a reset input, a counting input and an inhibit input, said reset input being connected to said reference pulse sensor, said counting input being connected to said tooth pulse sensor, and said inhibiting input being connected to a peak value circuit means;

(d) peak value circuit means for determining the peak value of the ionic current in a combustion chamber which corresponds to peak combustion chamber pressure by evaluating the current flowing through the ignition sparkplug and generating an inhibiting signal to said inhibiting input when said peak value of said ionic current is reached, including the ignition sparkplug and means for supplying a positive measuring voltage to the sparkplug;

(e) a comparator circuit for comparing the count of the counter with a desired value supplied to the comparator circuit and providing a correction signal which indicates when the peak value of the ionic current is occurring with respect to a desired time; and (f) a trigger circuit responsive to said correction signal for supplying a trigger signal so that said ignition signal is supplied to said sparkplug.

2. Arrangement according to claim 1, characterized in that the trigger circuit comprises a preadjustable counter.

3. Arrangement according to claim 2, characterized in that a gate circuit is coupled to the trigger circuit and inhibits the correction signal from the comparator circuit if the speed of the engine falls below a desired speed value.

* * * * *